United States Patent [19]

Bollefer

[11] 4,067,314

[45] Jan. 10, 1978

[54] SOLAR ENERGY COLLECTOR SYSTEM

[75] Inventor: Dwight L. Bollefer, Underwood, Minn.

[73] Assignee: Dwight L. Bollefer, Underwood, Minn.

[21] Appl. No.: 645,274

[22] Filed: Dec. 29, 1975

[51] Int. Cl.² .............................................. F24J 3/02
[52] U.S. Cl. ..................................... 126/270; 126/271
[58] Field of Search ...................... 126/270, 271; 62/2; 60/641

[56] References Cited

U.S. PATENT DOCUMENTS

| 2,693,939 | 11/1954 | Marchant et al. | 126/271 |
| 3,242,679 | 3/1966 | Puckett et al. | 62/2 |
| 3,390,672 | 7/1968 | Snelling | 126/271 |
| 3,847,136 | 11/1974 | Salvail | 126/271 |
| 3,901,036 | 8/1975 | Martin | 126/270 |
| 3,919,998 | 11/1975 | Parker | 126/270 |
| 3,957,109 | 5/1976 | Worthington | 126/271 |
| 3,958,554 | 5/1976 | Schmidt | 126/271 |

Primary Examiner—John J. Vrablik
Attorney, Agent, or Firm—Schroeder, Siegfried, Ryan & Vidas

[57] ABSTRACT

A solar energy heating or cooling system and method of performing the same is disclosed comprising a solar collector mechanism disposed generally on the roof of the structure for which it is to be used and supplied internally with a heat transfer medium of the halogenated hydrocarbon family having characteristics permitting expansion from a liquid to a gas, the collector mechanism being connected to an energy storage means having a plurality of conduit means disposed therewithin and connected to a reservoir for collection of a liquid, the liquid being pumped back to the solar collector mechanism by a pump for expansion into a gas, with control means being connected between the solar collector mechanism and the pump for controlling the level of the heat transfer medium.

1 Claim, 3 Drawing Figures

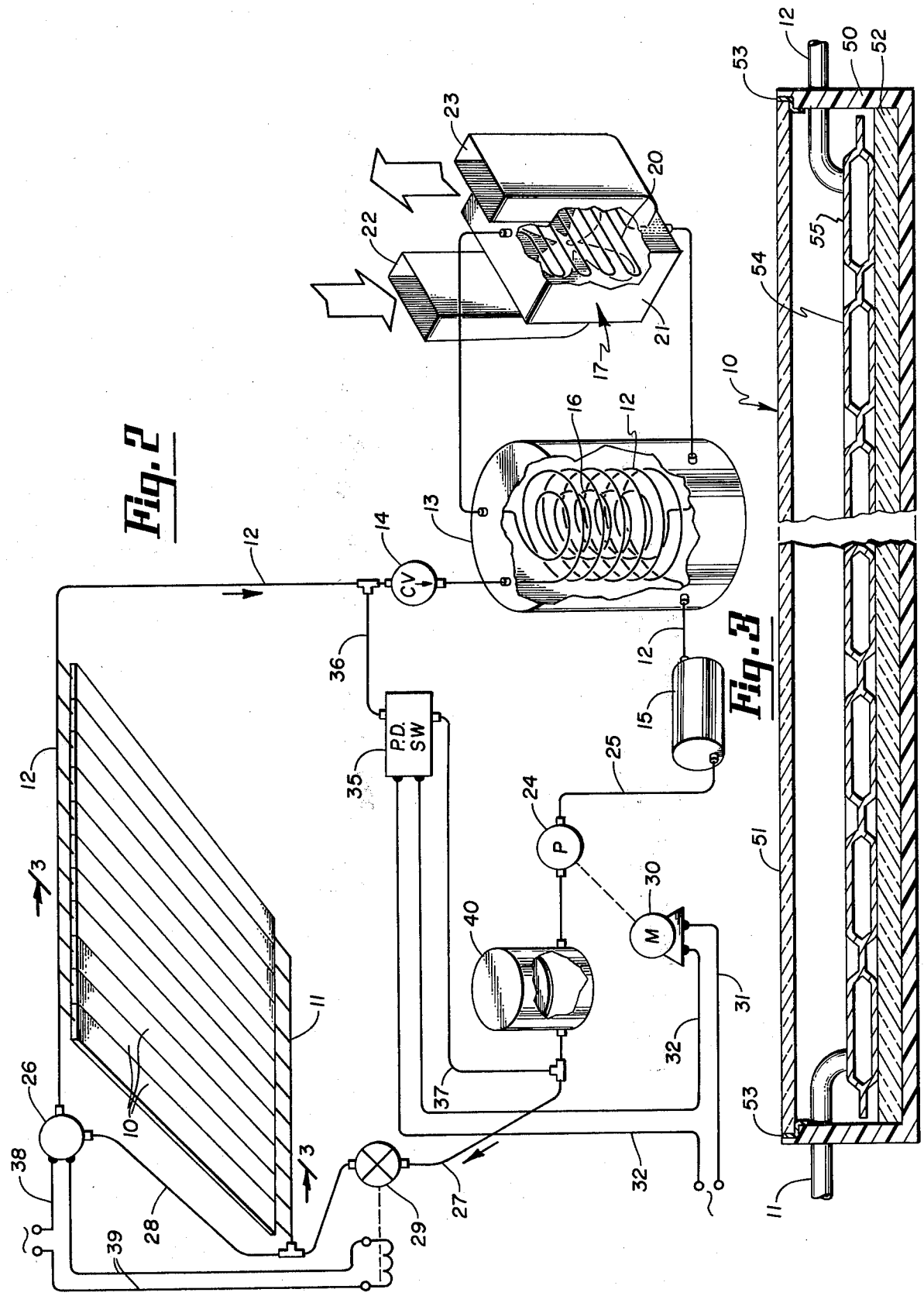

SOLAR ENERGY COLLECTOR SYSTEM

This invention relates to the field of solar energy and more particularly to the field of solar energy collector systems and methods of operating the same.

It is generally known that solar collectors may be used with various forms of auxiliary heaters or heat pumps in systems in which the solar collector uses water as a heat transfer medium. Those systems use water heated by the sun and store the same in some form of storage tank. The stored heat is transferred through the use of a fan and coil unit to the building supply air. A hot water preheat coil is used for preliminary heating of domestic hot water which is stored in a separate tank. It is also known that solar energy can also be collected using air in place of water as the heat transfer medium, minimizing the freezing and corrosion problems. When used in this manner, the heat collected is transferred by a fan-coil unit to a storage water tank and then to the building load. However, the use of air as a heat transfer medium has also been found to be very inefficient in operation.

The present invention makes use of a halogenated hydrocarbon which is chemically known as Dichlorotetrafluoroethane. Through the use of the halogenated hydrocarbon, it has been found that a collector cell or series of collector cells may be used in which the transfer medium takes on heat and changes state when the cells are exposed to solar energy and the gas in then conducted to a heat storage device where the heat is absorbed within the storage device and the gas then reverts to a liquid as the heat of condensation changes it to its liquid form. In its liquid form, it flows to a small receiver tank where it may again be pumped to the collector cells. Any time the liquid injector pump is stopped, the cells merely evaporate the remainder of the liquid in the cell and the heat energy is passed to the heat storage device where the cell will then remain empty until additional energy is desired from the cell. Thus through the use of this device, there is no requirement to protect the cells during freezing weather and no requirement to drain any conduits to prevent freezing of water lines or liquid lines.

It is therefore a general object of the present invention to provide an improved solar collector system and method of operation using a halogenated hydrocarbon as a heat transfer medium.

It is still another object of this invention to provide an improved solar collector system and method of operation which will operate in freezing weather whether receiving energy from the sun or not.

It is still another object of this invention to provide an improved solar collector system and method of operation which does not require draining when not in use.

It is still a further object of this invention to provide an improved solar collector system and method of operation which does not require a time delay in heat transfer.

These and other objects and advantages of the invention will more fully appear from the following description, made in connection with the accompanying drawings, wherein like reference characters refer to the same or similar parts throughout the several views, and in which:

FIG. 2 is a schematic drawing of an alternate version of an embodiment of the invention; and FIG. 3 is a partial cross-sectional view of a solar collector cell taken along lines 3—3 of FIG. 2.

Figure 1:
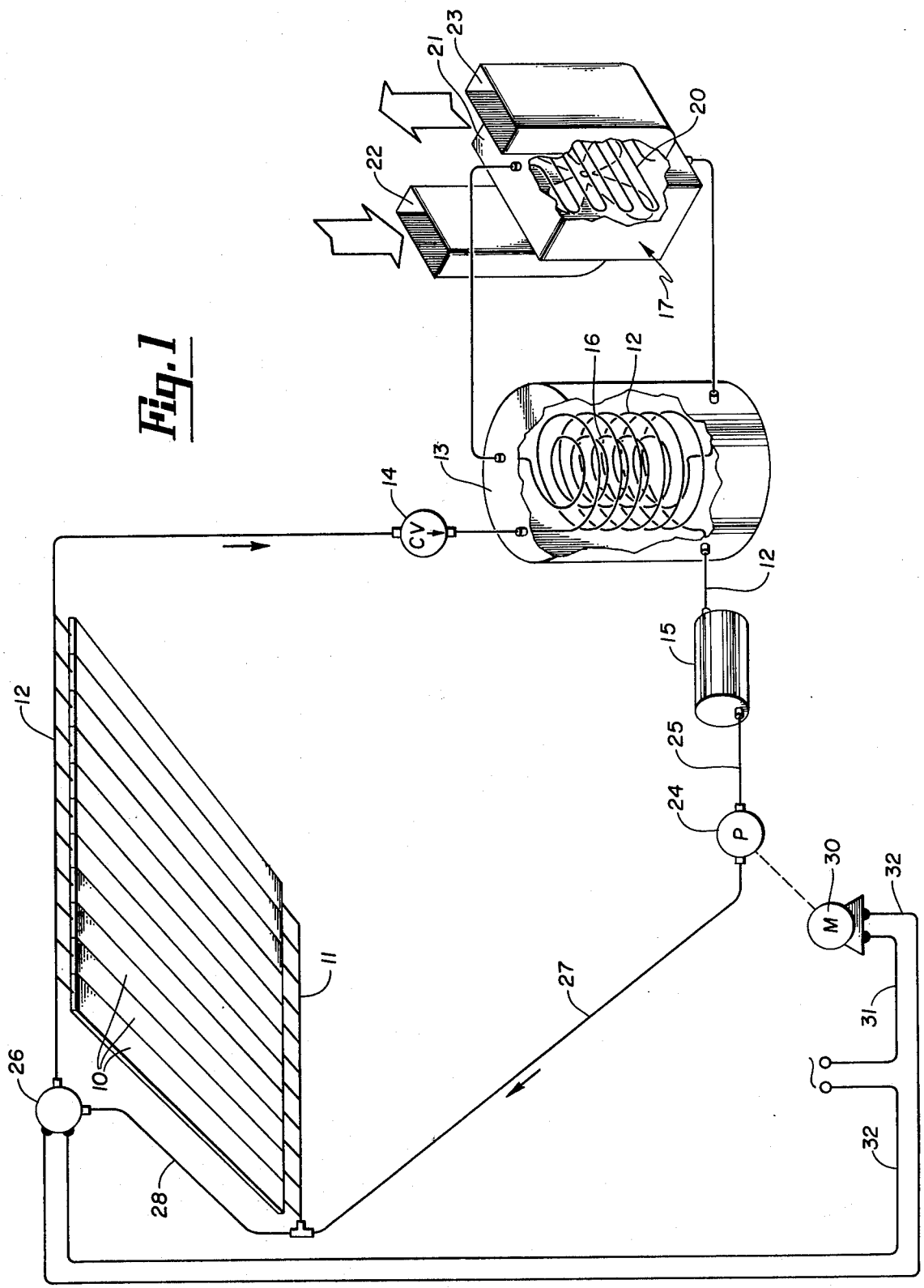
FIG. 1 is a schematic drawing of one embodiment of the invention.

A plurality of solar collector cells 10 are shown connected in parallel through the use of a conduit member 11 on the input side of the collector cells and the output side of the collector cells are also connected in parallel through the use of a conduit member 12. Generally speaking, some 700 to 800 square feet of solar cell area is required for the average size house and conduits 11 and 12 may be two small copper lines which are required to transfer the heat from the collectors to the rest of the system within the housing structure. Conduit 12 is connected to a heat storage mechanism 13 through a check valve 14. Check valve 14 is located on the input side of the heat storage mechanism 13 to stop any reverse flow of the transfer medium during a very cold climatic condition where the fluid would have a tendency to reverse itself and thus rob heat from the heat storage device. The heat transfer medium which is circulated through the conduit system and solar cells is a halogenated hydrocarbon and it is chemically known as Dichlorotetrafluoroethane. The heat storage mechanism 13 may take on the form of a large tank in which conduit 12 continues in a coiled manner and is connected at an output port to a liquid receiver tank 15 through a continuation of conduit 12. Heat storage mechanism 13 may contain a form of liquid which then retains the heat given up by the halogenated hydrocarbon transfer medium. Another coil 16 contained within heat storage mechanism 13 has a suitable medium contained therein which may be some form of liquid which is then connected to a heat use device through another coil 20 located within a fan chamber 21. In other words, a liquid is circulated through coil 12 and its extending fluid conductors which are connected to coil 12 within fan chamber 21 where the heat is given up as air enters through a duct 22 and is blown outwardly through a hot air duct 23. Liquid receiver tank 15 is connected to a pump 24 by a suitable conduit 25.

A liquid level control 26 may be of any generally well-known float type such as that manufactured by Refrigeration Specialties of Broadview, Illinois, Type LL-Cat. No. 13350, to control the level of liquid in solar collector cells 10. In other words, the liquid level control mechanism 26 is connected to the input of input conduit 11, both of which are connected to another conduit 27 having its other end connected to the output of pump 24 to complete the fluid circuit. Liquid level control 26 is also connected to output conduit 12. A motor 30 is used to drive pump 24 and is connected to an electrical source (not shown) through a pair of electrical leads 31 and 32. Lead 32 is connected to liquid level control 26 and is internally connected to a pair of switch contacts which are actuated upon the liquid level control 26 sensing a low level condition of the liquid in the solar collector cells 10. Thus upon motor 30 being energized, pump 24 delivers additional liquid halogenated hydrocarbon to the solar collector cells 10. Through the use of the injector pump 24, circulating pumps used with water are eliminated, and in the case of air solar collectors, the fans and cumbersome duct work for the transfer of heat are also eliminated. Thus by using a halogenated hydrocarbon heat transfer medium it will be found that through the use of the change of state as the heat transfer media, it will allow much less medium to be transferred for the same amount of useful heat energy.

In this system, no adverse effects are experienced by outside environmental conditions because the fluid never freezes allowing this system to be shut down at any time regardless of the temperature. Additionally, there is no build-up of excessive heat and pressure during shut-off periods at high temperatures. This system merely empties itself and is collected in the liquid receiver tank. An additional benefit of the use of halogenated hydrocarbons is that the internal parts of the system are never subject to oxidation or corrosion of any kind. Furthermore, the heat storage mechanism 13 can be a totally potable water storage system without any secondary circulating systems involved which might be subject to certain building codes.

Through the use of the halogenated hydrocarbons, no time delay in heat transfer is experienced, even if it is a hazey or partially cloudy day. If the temperature of the solar collector is even slightly above that of the heat storage device 13, it will immediately start passing heat to the heat storage device. If higher temperatures are desired, or faster transfer of heat is required, this may be accomplished by adding a heat booster at the heat storage device 13 which then increases the differential between the heat storage device and the solar collector.

An alternate embodiment of the invention is shown in FIG. 2 in which a pressure differential switch 35 is fluidly connected between conduit 12 and 27 by a pair of conduits 36 and 37. Connected between conduit 37 and pump 24 in the output conduit 27, is a surge chamber 40. Liquid level control 26 is fluidly connected in the same manner as found in FIG. 1 and a solenoid valve 29 is connected in conduit 27 between conduits 11 and 37. Solenoid 29 is electrically connected to an electrical source (not shown) through a series connection with liquid level control 26 and a pair of electrical lines 38 and 39.

When the pressure differential reaches the predetermined limit, a switch is closed (not shown) which is connected to electrical lines 32 causing motor 30 to be actuated and increase the liquid in surge tank 40. Upon liquid level control 26 sensing a difficiency of liquid, its switch is closed, opening solenoid 29 and permitting liquid to be pumped into solar collector cells 10. The surge tank 40, pressure differential switch 35, control 26 and solenoid 29 are thus used to control the flow of liquid halogenated hydrocarbon through the solar collector cells 10.

In both FIGS. 1 and 2, check valve 14 prevents reverse flow of the fluid back to the collectors 10 from the heat storage mechanism 13.

The solar collector cell is shown in FIG. 3 having an outer housing 50 formed of a high impact plastic. The housing 50 is constructed and arranged on its upper edges to receive one or more glass panes 51. At the bottom of housing 50 is a sheet of insulation 52 which may be of a high density foam material such as polyurethane. A suitable sealing tape 53 may be used to seal the glass pane 51 to the housing 50 and it has been found that an industrial tape No. 838 sold by the 3 M Company of St. Paul, Minnesota, has proved to be suitable for this purpose.

A flat hollow cell element 54 is formed with multiple passages so that it will absorb the maximum amount of solar energy and cause the liquid to expand at a desirable rate. A structure which has been found to be most suitable is much like a honeycomb structure and it is designated as Model FS-77-67 and is manufactured by Olin Brass Corporation of East Alton, Illinois.

Cell element 54 is also coated with a black enamel coating 55 which provides a light absorbing and fusing surface. One such enamel which has proved to be successful is that of the 3 M Company known as a "Nextel" brand coating, No. 101-C10.

As shown in FIGS. 1 and 2, the solar cells are connected in parallel and of course if it is desirable, fluid level controls may be installed in each of the legs of conduit 11 so that solar collector cells may be added or subtracted to the overall number of cells being used if it is desirable.

It will, of course, be understood that various changes may be made in the form, details, arrangement and proportions of the parts without departing from the scope of the invention which consists of the matter shown and described herein and set forth in the appended claims.

What is claimed is:

1. A solar energy collector system comprising:
   a. solar collector cell means having a substantially flat heat absorbing surface on at least one side thereof, said cell means including at least one fluid passage having input and output orifices;
   b. heat storage means having conduit means formed internally thereof, with one end of said conduit means communicating with said output orifice of said solar collector cell means, and having fluid conductors in said heat storage means independent of said conduit means constructed and arranged to be connected to a heat use device;
   c. liquid receiver tank means having its input port connected to the other end of said conduit means and having an output port;
   d. injection pump means having its input connected to said output port of said liquid receiver tank means and having its output connected to the input orifice of said solar collector cell means;
   e. a heat transfer medium having characteristics of a halogenated hydrocarbon fluid changing state between a gas and a liquid contained within each of said means;
   f. liquid level control means communicating with the input orifice of said solar collector cell means and the output orifice of said injection pump means, said liquid level control means controlling the level of said heat transfer medium in said solar collector cell means;
   g. check valve means fluidly disposed between said solar collector cell means output orifice and said one end of said first conduit means in said heat storage means preventing flow of said heat transfer medium towards said solar collector cell means;
   h. a liquid surge tank having its input and output connected between the output and input orifices respectively of said injection pump means and said solar collector cell means;
   i. and a pressure differential switch fluidly communicating with said input and output orifices of said solar collector cell means and controllably connected to said injection pump means for controlling the fluid level of said heat transfer medium.

* * * * *